United States Patent Office 3,069,228
Patented Dec. 18, 1962

3,069,228
METHOD OF DEHYDRATING URANIUM TETRAFLUORIDE
James O. Davis, Carl C. Fogel, and Willard E. Palmer, Harrison, Ohio, assignors to the United States of America as represented by the United States Atomic Energy Commission
No Drawing. Filed May 9, 1961, Ser. No. 108,956
4 Claims. (Cl. 23—14.5)

Our invention relates to the processing of uranium tetrafluoride and more particularly to a method of drying hydrated uranium tetrafluoride.

Uranium tetrafluoride is an intermediate in the preparation of uranium metal both from uranium ore concentrates and from uranium hexafluoride. $UF_4$ is normally prepared from impure uranium ore concentrates by dissolving the ore concentrate in nitric acid, extracting uranium from the resulting solution with an organic solvent, re-extracting the uranium into aqueous solution, denitrating the resulting solution to obtain $UO_3$, reducing the $UO_3$ with hydrogen and reacting the resulting $UO_2$ with anhydrous hydrogen fluoride. Since the latter steps in this process are carried out at elevated temperatures the product $UF_4$ is essentially free of moisture and no further drying is required.

While dry $UF_4$ suitable for metal preparation is obtained by this process, a disadvantage is presented in the high cost of the numerous process steps. This is particularly the case for uranium scrap material which is only slightly contaminated with impurities.

Less expensive aqueous processes have been developed to eliminate the solvent extraction and high temperature reduction and hydrofluorination steps. For example, $UF_4$ is prepared from impure uranium-bearing material by dissolving the material in hydrochloric acid, filtering the resulting solution to remove insoluble impurities and reacting the solution with a copper sulfate solution, excess hydrofluoric acid and gaseous sulfur dioxide to precipitate $UF_4$. The $UF_4$ is then separated by filtration.

One of the problems presented in the use of this wet-process $UF_4$ is removal of moisture from the precipitate. The $UF_4$ precipitate thus obtained is in the form of the hydrate $UF_4 \cdot \frac{3}{4} H_2O$, and in addition the precipitate contains a substantial quantity of free moisture. The free moisture is readily removed by heating the precipitate to a temperature of approximately 115° C. in a conventional steam-heated dryer. Removal of the water of hydration, however, requires much higher temperatures and careful control of heating conditions to prevent the formation of excessive amounts of uranium oxides and uranyl fluoride. Expensive high-temperature calciners or furnaces have been required for this operation, and considerable labor has been expended in materials handling. For use in the preparation of uranium metal, $UF_4$ with a moisture content of less than about 0.2 weight percent is desired.

In addition to drying of the precipitated $UF_4$, blending of this $UF_4$ with $UF_4$ produced by other methods is frequently desired. For example, where $UF_4$ for metal preparation is produced by hydrogen reduction of $UF_6$ and smaller amounts of $UF_4$ are concurrently produced from metal-fabrication scrap by the aqueous process described above, blending of the $UF_4$ from the two sources is advantageous in producing a uniform metal product. Owing to differences in chemical composition and physical properties such as density and particle size the two types of $UF_4$ would otherwise produce metal of varying quality.

It is, therefore, an object of our invention to provide a method of drying $UF_4$.

Another object is to provide a method of dehydrating $UF_4 \cdot \frac{3}{4} H_2O$.

Another object is to provide a method of blending aqueous-precipitated $UF_4$ with $UF_4$ prepared by reacting $UF_6$ with hydrogen.

Other objects and advantages of our invention will be apparent from the following detailed description and claims appended hereto.

In accordance with our invention, moisture-containing $UF_4$ is dried by reacting gaseous $UF_6$ and hydrogen under such conditions as to produce $UF_4$ and dispersing said moisture-containing $UF_4$ into the resulting $UF_6$-hydrogen reaction mass. Aqueous-precipitated $UF_4$ is readily dried by this means without interfering in any way with the reaction of $UF_6$ and hydrogen. The dried $UF_4$ product obtained in this manner is a uniform blend of the aqueous-precipitated $UF_4$ and the $UF_4$ produced by the reaction of $UF_6$ and hydrogen.

We have found that $UF_4$ may be dried in an operating $UF_6$-hydrogen reactor without detrimental effect to the $UF_6$ reduction process or to the quality of the product $UF_4$. Although it would be expected that $UF_6$ might react with the water vapor from the hydrated $UF_4$ to produce uranyl fluoride and uranium oxides, the hydrogen and HF off-gas present from the reaction of $UF_6$ with hydrogen apparently act to prevent formation of excessive amounts of these compounds.

Our invention is applicable to drying $UF_4$ containing up to approximately 5 weight percent total water. It is preferred, however, to remove the free moisture from precipitated $UF_4$ by heating the precipitate to a temperature of about 115° C. for a period of approximately 30 minutes prior to treating the $UF_4$ by the method of our invention. Precipitated $UF_4$ partially dried in this manner usually contains 3 to 4 percent moisture in the form of water of hydration.

Although the method of our invention is not to be understood as limited to a particular apparatus, this method is particularly applicable to $UF_6$-hydrogen reactors of the "hot-wall" type. This type of reactor comprises an externally heated, vertically disposed, elongated metallic cylinder provided with inlets at the top for introducing gaseous $UF_6$ and hydrogen and a container at the bottom for collecting product $UF_4$. This type of reactor is normally employed for preparation of $UF_4$ from $UF_6$ of natural uranium isotopic composition or $UF_6$ slightly enriched, i.e., up to 5 percent, in fissionable uranium 235. In the operation of this type of reactor, the reactor walls are heated to a temperature of at least 550° C. and preferably 630° C., and gaseous $UF_6$ and hydrogen are concurrently and continuously introduced. The $UF_6$ and hydrogen react exothermically to produce a maximum temperature of about 850° C. to 900° C. within the reactor. The reaction proceeds smoothly, and a relatively constant temperature is maintained. The reactor pressure is regulated to slightly above atmospheric pressure, in the range of 0 to 10 pounds per square inch gauge. Excess hydrogen is required for complete conversion of $UF_6$ to $UF_4$, with approximately 30 percent being preferred. Greater proportions of hydrogen may result in a low-density product unsuitable for preparation of uranium metal.

The moisture-containing $UF_4$ is introduced as dispersed particles into the $UF_6$-hydrogen reaction mass along with these reagents. In order to provide for uniform dispersion of the moisture-containing $UF_4$ it is preferred to continuously introduce this material by entraining it in the influent hydrogen gas stream. The $UF_4$ may be entrained by continuously conveying the $UF_4$ by means of a conventional auger into a cylindrical mixing chamber into which the hydrogen gas stream is tangentially introduced to obtain turbulent flow. The size of the dispersed moisture-containing $UF_4$ particles is not critical, and aqueous-precipitated $UF_4 \cdot \frac{3}{4} H_2O$ may be employed without pulverization.

Although the proportion of moisture-containing $UF_4$ supplied to the $UF_6$-hydrogen reaction mass is not critical, it is preferred to supply hydrated $UF_4$ at a rate sufficient to provide a hydrated-source content in the resulting blend of 5 to 25 weight percent. For greater proportions of hydrated $UF_4$ additional external heat may be required. The blended $UF_4$ product is recovered by separating the $UF_4$ from the effluent gas stream. A major proportion of the $UF_4$ falls out of the stream and may be collected by providing a container at the bottom of the reactor. The remainder of the $UF_4$ may be separated by conventional filtration.

The resulting blended $UF_4$ meets normal specifications for uranium metal preparation, that is, an ammonium oxalate insoluble (uranium oxides) content below 2 weight percent, a uranyl fluoride content from 0.5 to 2.0 weight percent, a moisture content under approximately 0.2 weight percent and a tap density above 3.3 grams per cubic centimeter. The blended $UF_4$ may be converted to uranium metal by reduction with magnesium or calcium, and any of the previously known techniques may be employed for this reaction.

In processing $UF_4$ enriched in fissionable uranium 235 it is preferred to blend the moisture-containing $UF_4$ with $UF_4$ having the same degree of isotopic enrichment in order to avoid dilution of costly enriched material. However, blending of materials of differing isotopic enrichments can be conveniently accomplished by this means when it is desired to do so.

Our invention is further illustrated by the following specific examples.

EXAMPLE I

Hydrated $UF_4 \cdot \frac{3}{4} H_2O$ prepared by aqueous precipitation was dried and blended with $UF_4$ produced by hydrogen reduction of $UF_6$ in a series of pilot-plant scale runs. The initial moisture content of the hydrated $UF_4$ was approximately three weight percent. The hydrated $UF_4$ was fed into the top of a $UF_6$-hydrogen reactor from a closed hopper provided with a variable speed discharge screw. The $UF_6$-hydrogen reactor comprised a cylinder 20 feet long and 15 inches in diameter, the cylinder being comprised of the nickel-base alloy available commercially under the trade name "Monel." $UF_6$ was fed into the top of the reactor at a pressure of 1 p.s.i. gauge and a rate of 13 pounds per minute. Hydrogen 30 percent in excess of the stoichiometric amount required to react with the $UF_6$ was concurrently fed into the top of the reactor through a separate nozzle. The reactor walls were heated externally to a temperature of 630° C. by means of external ribbon-element resistance heaters. The hydrated $UF_4$ was fed at varying rates for each of a series of runs to produce blends of varying compositions. The resulting $UF_4$ blend was collected from the reactor discharge in each run and analyzed to determine water content, tap density, $UO_2F_2$ content and ammonium oxalate insoluble (uranium oxides) content. Further details and results obtained may be seen by reference to the following table.

*Table I*

DRYING AND BLENDING OF HYDRATED $UF_4$

| Run No. | Total weight $UF_4$ (lbs.) | Blend composition (percent hydrated-source $UF_4$) | Ammonium oxalate insoluble content (wt. percent) | $UO_2F_2$ content (wt. percent) | $H_2O$ content (wt. percent) | Tap density (g./cc) |
|---|---|---|---|---|---|---|
| 1 | 665 | 20 | 0.30 | 0.57 | 0.15 | 3.33 |
| 2 | 374 | 33 | 0.82 | 1.18 | 0.23 | 3.45 |
| 3 | 2,570 | 28 | 1.78 | 1.97 | 0.16 | 3.70 |
| 4 | 4,718 | 18 | 0.64 | 1.00 | 0.10 | 3.85 |

It may be seen from the above table that the moisture content of the blended $UF_4$ was reduced to the desired level in each case. The blended $UF_4$ was well within normal metal-preparation specifications with respect to tap density, $UO_2F_2$ content and ammonium oxalate insoluble content.

EXAMPLE II

Blended $UF_4$ produced in each of the runs described in Example I was subjected to reduction with magnesium in order to determine further the suitability of this material for metal preparation. For each of the first three runs batch reductions were conducted in the following manner: The $UF_4$ was blended with 4 percent excess of the stoichiometric amount of magnesium required to reduce the uranium, and a cylindrical steel vessel 18 inches high, 7.25 inches in inner diameter, and lined with a magnesium fluoride liner tapered from 1.25 inches thickness at the bottom to 0.75 inch at the top was filled with the resulting blend. The reactor was sealed and heated in an induction furnace until the mixture ignited. After cooling the reactor was broken open and the resulting uranium derby was removed. For run 4 the same procedure was follower except that a larger reactor was used (42 inches high, 15.375 inches inner diameter at the top and 14.250 inches inner diameter at the bottom). The results obtained may be seen by reference to the following table.

*Table II*

REDUCTION OF BLENDED $UF_4$

| $UF_4$ from Run No. | Percent hydrated-source $UF_4$ | Number of reductions carried out | Average yield (percent) | Average firing time (minutes) |
|---|---|---|---|---|
| 1 | 20 | 13 | 97.9 | 123 |
| 2 | 33 | 8 | 96.9 | 150 |
| 3 | 28 | 4 | 98.6 | 143 |
| 4 | 18 | 6 | 98.1 | 301 |

The uranium derbies produced as described above separated cleanly from reaction-product slag and were suitable for metal fabrication, both with respect to chemical impurity content and physical properties.

It may be seen from the above table that the blended $UF_4$ prepared by the method of our invention may be readily reduced to high-quality metal at high yields.

The above examples are merely illustrative and are not to be construed as limiting in any manner the scope of our invention, which is limited only as indicated in the appended claims.

Having thus described our invention, we claim:

1. The method of dehydrating $UF_4 \cdot \frac{3}{4} H_2O$ and blending the resulting $UF_4$ with $UF_4$ produced by reacting $UF_6$ and hydrogen which comprises continuously introducing said $UF_6$ and said hydrogen into the top of a vertically disposed reaction zone under such conditions as to effect a reaction whereby $UF_4$ is formed, continuously dispersing said $UF_4 \cdot \frac{3}{4} H_2O$ into the top of said reaction zone and recovering the resulting blended $UF_4$.

2. The method of claim 2 in which said $UF_4 \cdot \frac{3}{4} H_2O$ is dispersed in said reaction zone at a rate sufficient to provide a proportion of from 5 to 25 weight percent of the total resulting blended $UF_4$.

3. The method of dehydrating $UF_4 \cdot \frac{3}{4} H_2O$ and blending the resulting $UF_4$ with $UF_4$ produced by reacting $UF_6$ and hydrogen which comprises continuously introducing a stream of $UF_6$ and a stream of hydrogen containing said $UF_4 \cdot \frac{3}{4} H_2O$ dispersed therein into the top of a vertically disposed reaction zone, said reaction zone being heated to a peripheral temperature of 550° C. to 700° C., and recovering the resulting blended $UF_4$.

4. The method of drying hydrated $UF_4$ containing up to 5 weight percent total water and blending the resulting $UF_4$ with $UF_4$ produced by reacting $UF_6$ and hydrogen which comprises continuously contacting gaseous $UF_6$ and gaseous hydrogen in a reaction zone under such conditions as to effect a reaction whereby $UF_4$ is formed, continuously dispersing said water-containing $UF_4$ into the resulting reaction mass and recovering the resulting blended $UF_4$.

References Cited in the file of this patent

UNITED STATES PATENTS 2,907,629     Smiley et al. _____ Oct. 6, 1959

FOREIGN PATENTS 821,957     Great Britain _____ Oct. 14, 1959

OTHER REFERENCES

Harrington and Rueble: "Uranium Production Technology," pp. 479–483 (1959).